3,487,116
METHOD FOR HYDROGENATION OF
CINNAMYL ALCOHOLS
Paul N. Rylander, Newark, N.J., assignor to Engelhard Industries, Inc., Newark, N.J., a corporation of Delaware
No Drawing. Filed June 16, 1966, Ser. No. 557,877
Int. Cl. C07c 29/00, 31/14
U.S. Cl. 260—618                1 Claim

ABSTRACT OF THE DISCLOSURE

Palladium supported on kieselguhr or magnesium carbonate is employed as a catalyst for hydrogenation of cinnamyl alcohols to phenylpropanols substantially free of hydrogenolysis products.

---

This invention relates to a process for the hydrogenation of cinnamyl alcohols and more particularly to a new and improved process for the hydrogenation of the olefinic bond of cinnamyl alcohol and/or nuclear substituted derivatives thereof to produce the corresponding phenylpropanol.

Cinnamyl alcohol having the formula

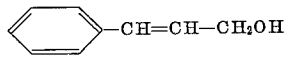

contains a C—OH bond which is activated by the allylic double bond. That is to say, the hydroxyl group is rendered more liable by reason of its position relative to the double bond, and accordingly is found to undergo hydrogenolysis when the compound is treated under hydrogenation conditions with hydrogen in the presence of a metallic hydrogenation catalyst. Hydrogenation of cinnamyl alcohol to produce phenylpropanol thus often results in partial hydrogenolysis with attendant production of phenylpropane as an undesired reaction product.

In accordance with the present invention, it has been found that the olefinic double bond of cinnamyl alcohol and/or its nuclear substituted derivatives can be hydrogenated to produce the corresponding phenylpropanol by means of a palladium catalyst supported on a carrier selected from the group consisting of kieselguhr and magnesium carbonate, and that utilization of this particular supported catalyst results in a marked reduction of the hydrogenolysis reaction ordinarily encountered in such hydrogenation. The hydrogenated product produced by the present invention is essentially free of hydrogenolysis products. Further, the preferred catalysts which are employed in the process of the invention provide a rapid rate of hydrogenation of the olefinic double bond.

The palladium content of the supported catalyst may range, by weight, from about 0.5–20%, preferably from about 2%–10% (based on weight of support plus palladium). The catalyst may be prepared by conventional methods, e.g. by impregnation of the support with an aqueous solution of a water-soluble palladium compound, followed by reduction to the metallic form and drying. Alternatively, the palladium may be in the form of a readily reducible compound, e.g. the oxide, and the metallic palladium being formed during the course of the hydrogenation.

The hydrogenation of the cinnamyl alcohol is ordinarily effected in an inert organic solvent, and for this purpose any of the conventional solvents, e.g. acetic acid, ethanol, methanol, ethyl acetate, toluene, octane and the like may be employed. Operating conditions for the hydrogenation of the invention include a temperature between about 0° C. and 150° C., preferably from 20 to 50° C., and pressure from atmospheric to 1000 p.s.i.g. The hydrogenation can be carried out either in continuous or batchwise operation.

The process of the present invention can be employed for the hydrogenation of the double bond of cinnamyl alcohol and of substituted cinnamyl alcohols having one or more substituents in the aromatic ring, including alkyl, hydroxyl, alkoxy, carboxyl, ester and amine substituents. Example of such compounds are o-methylcinnamyl alcohol; p-hydroxycinnamyl alcohol; m-ethoxycinnamyl alcohol; 3,4-dioxymethylenecinnamyl alcohol; 4-n-butylcinnamyl alcohol; 3,4-dihydroxycinnamyl alcohol; 3-hydroxy-4-methoxycinnamyl alcohol and the like.

Test runs were carried out for the purpose of comparing the catalysts of the present invention with palladium catalysts on various supports for the hydrogenation of cinnamyl alcohol to phenylpropanol. The hydrogenation was carried out in each run by first charging a mixture of 2.58 g. cinnamyl alcohol and 50 ml. of acetic acid as diluent, and also 100 mg. of 5% Pd on various supports (as indicated in the table below) to a hydrogenation reactor. The reactor was placed in a shaker, evacuated and filled with $H_2$ three times, and the shaker started. Each run was effected at ambient temperature (20° C.) and atmospheric pressure. In each case the catalyst was pre-reduced before charging to the hydrogenation reactor. The results of these test runs are set forth in the following table:

TABLE I.—HYDROGENATION OF CINNAMYL ALCOHOL

| Test Run No. | Catalyst | Ml. $H_2$ measured | Ml. $H_2$ corr. | Ml. $H_2$ per min. | Moles $H_2$ | Percent Hydrogenolysis |
|---|---|---|---|---|---|---|
| 1 | 5% Pd/Kieselguhr | 490 | 475 | 70 | 1.02 | 2 |
| 2 | 5% Pd/MgCO$_3$ | 495 | 480 | 38 | 1.02 | 2 |
| 3 | 5% Pd/C | 500 | 485 | 67 | 1.04 | 4 |
| 4 | 5% Pd/Silica | 505 | 490 | 12 | 1.06 | 6 |
| 5 | 5% Pd/CaCO$_3$ | 515 | 500 | 55 | 1.16 | 16 |
| 6 | 5% Pd/Al$_2$O$_3$ | 515 | 500 | 50 | 1.16 | 16 |
| 7 | 5% Pd/BaCO$_3$ | 520 | 505 | 12 | 1.19 | 19 |
| 8 | 5% Pd/SrCO$_3$ | 525 | 510 | 13 | 1.20 | 20 |
| 9 | 5% Pd/BaSO$_4$ | 535 | 519 | 7 | 1.24 | 24 |

The test results show that with the catalysts of the present invention, hydrogenation of the cinnamyl alcohol virtually ceases after absorption of the equivalent amount of hydrogen necessary for double bond saturation ($H_2$ equivalent=469 ml.) Each of the other catalysts tested results in substantial hydrogenolysis of the cinnamyl alcohol as shown by the excess hydrogen reacted. The "percent hydrogenolysis" is calculated on the basis of such excess hydrogen reacted.

Phenylpropanol has a sweet odor like that of hyacinth and is used in the preparation of perfumes. Phenylpropanol is also a preservative. When added to silage in relatively small amounts it improves preservation and quality of the feed.

What is claimed is:
1. A process for the hydrogenation of cinnamyl alcohol to produce phenylpropanol which comprises hydrogenating cinnamyl alcohol at a temperature between about 0° C. and 150° C. and a pressure from atmospheric to 1000 p.s.i.g. in the presence of a supported catalyst consisting essentially of palladium on magnesium carbonate, whereby phenylpropanol is produced essentially free of hydrogenolysis products.

References Cited
UNITED STATES PATENTS 2,055,437  9/1936  Groll et al. _____ 260—618

OTHER REFERENCES

Rosenmund et al.: Ber., vol. 56, 2262–4 (1923).

Nishimura et al.: Bull. Chem. Soc., Japan, vol. 33, 1356–9 (1960).

BERNARD HELFIN, Primary Examiner

M. W. GLYNN, Assistant Examiner

U.S. Cl. X.R.

252—443